United States Patent [19]

Zazzu et al.

[11] Patent Number: 5,408,080
[45] Date of Patent: Apr. 18, 1995

[54] ELECTRONICALLY TRIGGERED BAR CODE SCANNER

[75] Inventors: Victor Zazzu, Belle Mead, N.J.; Brian Zhang, New York, N.Y.; Wenyu Han, Demarest, N.J.; Xin Zheng, Blannelt, N.Y.; Mandel Glincman, Belle Mead, N.J.

[73] Assignee: Opticon Inc., Orangeburg, N.Y.

[21] Appl. No.: 20,445

[22] Filed: Feb. 9, 1993

[51] Int. Cl.$^6$ ............................................. G06K 7/10
[52] U.S. Cl. .................................. 235/462; 235/463; 235/472; 235/436
[58] Field of Search ............... 235/462, 463, 466, 467, 235/470, 472, 439, 436, 455

[56] References Cited

U.S. PATENT DOCUMENTS

| 4,859,840 | 8/1989 | Hasegawa et al. | 235/463 X |
| 5,196,684 | 3/1993 | Lum et al. | 235/472 X |
| 5,245,167 | 9/1993 | Takenaka | 235/463 X |
| 5,260,553 | 11/1993 | Rockstein et al. | 235/462 |
| 5,260,554 | 11/1993 | Grodevant | 235/462 |

FOREIGN PATENT DOCUMENTS 0142889  6/1989  Japan ................................... 235/462

Primary Examiner—Donald Hajec
Assistant Examiner—Esther H. Chin
Attorney, Agent, or Firm—Henry I. Sihanzer

[57] ABSTRACT

An automatic electronically triggered scanner includes photo sensing apparatus for reading bar code data and for decoding the bar code data and then ascertaining whether the bar code data is valid. Following the reading and decoding of a valid bar code, the further decoding of bar code data by the scanner is inhibited until a predetermined condition is met to ensure that the bar code just read (which provided valid data) is not reread. For the predetermined condition to be met the scanner must sense the absence of potentially valid bar code data for a preset interval following the decoding of each set of valid data. Subseqent to the preset interval during which only invalid data is present the scanner is placed in a condition to process valid data.

5 Claims, 3 Drawing Sheets

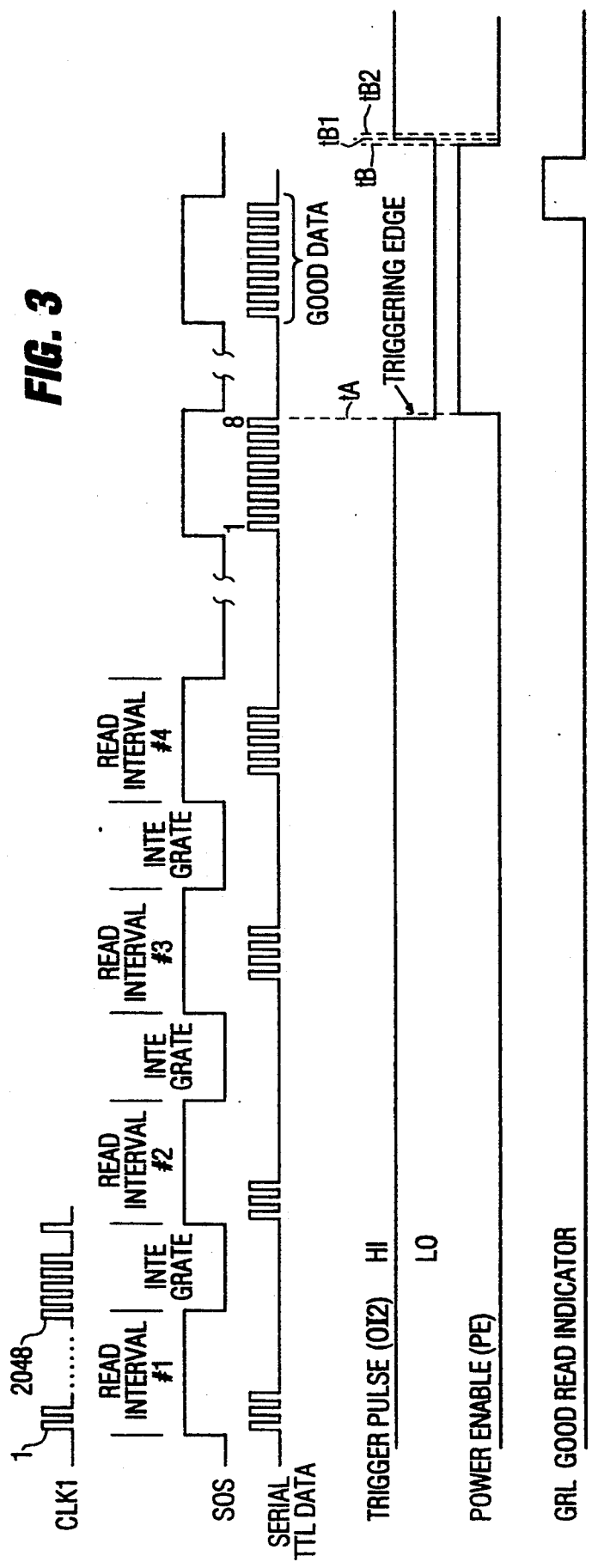

ELECTRONICALLY TRIGGERED BAR CODE SCANNER

BACKGROUND OF THE INVENTION

This invention relates to bar code scanners and, in particular, to bar code scanners capable of automatically scanning bar code data without a manually activated mechanical trigger to initiate a scan of bar code data.

Known hand held bar code scanners include a scanning head ("scanner") connected to a decoder box with the scanner including a manual mechanical trigger for, when depressed, initiating a scanning interval. Typically, an operator of a bar code scanner sights a bar code to be read and after aiming the scanner at the bar code depresses a manually activated mechanical trigger initiating a scanning cycle. In response to the manual actuation of the mechanical trigger the following events occur. The scanner emits a light beam which illuminates the bar code and light impinging on the bar Code is reflected back to the scanner. Concurrently, the scanner produces a "trigger pulse" which is applied to the decoder box to activate the decoder box and prepare it to receive bar code data signals. When the decoder box is ready to receive bar code data it produces an "enabling signal" [e.g., a power enable (PE) pulse] which it supplies to the scanner to indicate that the decoder box is ready to receive bar code data from the scanner. In response to the "enabling signal" a bar code scanner typically generates a train of start of scan (SOS) pulses having an "integrate" period followed by a "read" period. The SOS pulses are then applied to the electronic circuitry contained within the scanner. During the "read" period of each SOS pulse, bar code data reflected from the bar code is fed to the decoder box where it is analyzed. When the decoder box recognizes that a "good" (i e., "valid") set of bar code data has been sensed it generates an end of scan signal terminating the scanning cycle initiated by the actuation of the manual trigger. Thus, after a valid set of bar code data is decoded the SOS pulses are terminated and the scanner is reset and placed in a condition such that the next manual trigger starts a new scanning cycle. Thus, by means of the manual trigger multiple reads are avoided.

In many applications it is desired to have a hand held scanner which can "automatically" scan bar codes without the manual actuation of a mechanical trigger. The "automatic" or non-manually triggered scanning of bar codes eliminates the need for a mechanical trigger. Also, automatic or electronic scanning eliminates the need to repeatedly manually depress a trigger which some users find objectionable. Eliminating the need for a manually operated mechanical trigger switch avoids mechanical wear and increases the reliability of the system. Furthermore, automatic or electronic scanning may speed up the scanning process.

To make use of presently available equipment, it is also desirable that the "automatic" scanner be capable of being directly coupled to existing decoder boxes with the decoder boxes being operated as if a manually triggered scanner was connected to the decoder box. Thus the automatic scanner must be such that it can be interchanged for a manually triggered scanner without requiring the existing decoder boxes to be changed in any way. This poses significant problems as discussed below.

For an "automatic" bar code scanner to be able to recognize the presence of a bar code and to read the bar code data without the use of a manual trigger, the "automatic" scanner must be continuously enabled. This gives rise to a basic problem which exists whenever it is desired to automatically scan bar code data without the use of a manual trigger. Since an "automatic" hand held scanner is continuously enabled, such a scanner although it has just read bar code data and has validated the data, will then tend to reread the bar code it has just read. To prevent this obviously unacceptable condition the scanner must be disabled after it reads and validates a "good" set of bar code data. However, if the scanner is disabled it is evident that the scanner must then be re-enabled in order to "automatically" read another bar code. Accordingly, one problem to be solved is how to disable the scanner so it does not re-read the same bar code data and how to re-enable the scanner so it can automatically read a new bar code (other than the one just read) without manually activating a mechanical switch. Another problem is to have the "automatic" scanner interface with a existing decoder box such that it is transparent to the decoder box whether an "automatic" scanner or a manually triggered scanner is connected to it. This requires that the "automatic" scanner be able to generate a "trigger" pulse when ready to read data and supply the trigger pulse to the decoder box and for the scanner to be responsive to an "enabling signal" to initiate the supply of bar code data to a decoder box for analysis.

SUMMARY OF THE INVENTION

A scanner embodying the invention includes means for illuminating a selected bar code and for sensing the light information reflected from the bar code. The scanner also includes bar code data sensing means for determining whether a potentially valid bar code is present. In the discussion to follow, a "potentially valid bar code" is defined as a bar code corresponding to which at least M bar code data pulses are produced during a "reading" interval. The absence of a potentially valid bar code is identified by the sensing of less than M bar code data pulses during a reading interval. In response to the presence of a potentially valid bar code, the bar code data sensing means produces a trigger signal to a decoder and feeds bar code data to the decoder for analysis. The decoder analyzes the bar code data and after a valid set of bar code data has been read, it produces a signal which inhibits the scanner. The scanner is inhibited and cannot feed bar code data to the decoder box until the scanner senses the absence of potentially good bar code data for a predetermined period. Following the predetermined period, the scanner produces a trigger pulse in response to the presence of potentially valid bar code data.

An automatic hand held scanner embodying the invention is particularly suitable for use with a decoder box of the type which, following the receipt of a trigger signal from the scanner, is adapted to then receive bar code data signals from the scanner and to analyze the data and produce a "good read" signal applied to the scanner whenever a valid set of bar code data signals has been analyzed.

A particular hand held bar code scanner embodying the invention includes a charge-coupled device (CCD) type photodetector array, light source means for illuminating a bar code, and means for producing a train of start of scan (SOS) pulses having alternate "integrate"

and "read" periods. During each "integrate" period of each SOS pulse the elements of the CCD array are charged corresponding to the photo signals reflected from a bar code, and during each "read" period the bar code signals are digitized and processed. The scanner also includes bar code data sensing means comprising first and second resettable means. After being reset, the first means functions to produce a first signal in response to the occurence of N successive reading intervals during each of which less than M bar code data pulses are present. After being reset, the second means functions to produce a second signal, also defined as the "trigger signal" in response to the occurence of the first signal followed by the occurence of at least M bar code data pulses during a reading interval. In response to the occurence of the second ("trigger") signal, the decoder box enables the scanner via a power enable (PE) signal and bar code data is fed via the scanner to a decoder box for determining the validity of the data. In response to the presence of a valid set of bar code data the decoder box terminates the PE signal applied to the scanner which resets the first and second means.

Accordingly, each time the decoder indicates that a valid set of bar code data has been read, a new set of bar code data will be transferred to the decoder only after the following conditions are met:

1. A number "N" of successive SOS reading intervals must occur during each of which less than "M" bar code data pulses occur. [Note: It is assumed that a bar code must cause the production of at least M transitions or pulses to be valid.] Accordingly, following a "good" read there must occur "N" successive SOS reading intervals during which the bar code data cannot be good. This criteria ensures that the "good" bar code just read is no longer being read and will not be reread.
2. Following the sensing of "N" successive SOS reading intervals during which less than M bar code pulses occur, the scanner must sense the occurence of "M" bar code data pulses during an SOS read interval. This criteria ensures that a potentially valid bar code is present.

When conditions (1) and (2) are met, them and only then is a "trigger" pulse produced which is applied to the decoder box and which enables bar code data to be transferred to the decoder for analysis. These criteria ensure that a "new" bar code will be "automatically" read and analyzed to ascertain whether it is "good" or valid.

In a particular system, following the generation of a trigger pulse by the scanner and its application to the decoder box, the decoder box produces a power enable pulse which is applied to the scanner to then allow bar code data to be fed to, and analyzed by, the decoder. When the decoder determines that the data is valid, the power enable pulse is terminated and the scanner is inhibited. (reset) until conditions 1 and 2 defined above are met.

BRIEF DESCRIPTION OF THE DRAWINGS

In the accompanying figures like reference characters denote like components.

FIG. 3 is a diagram of waveforms associated with FIGS. 1 and 2.

DETAILED DESCRIPTION OF FIG. 1

Figure 1:
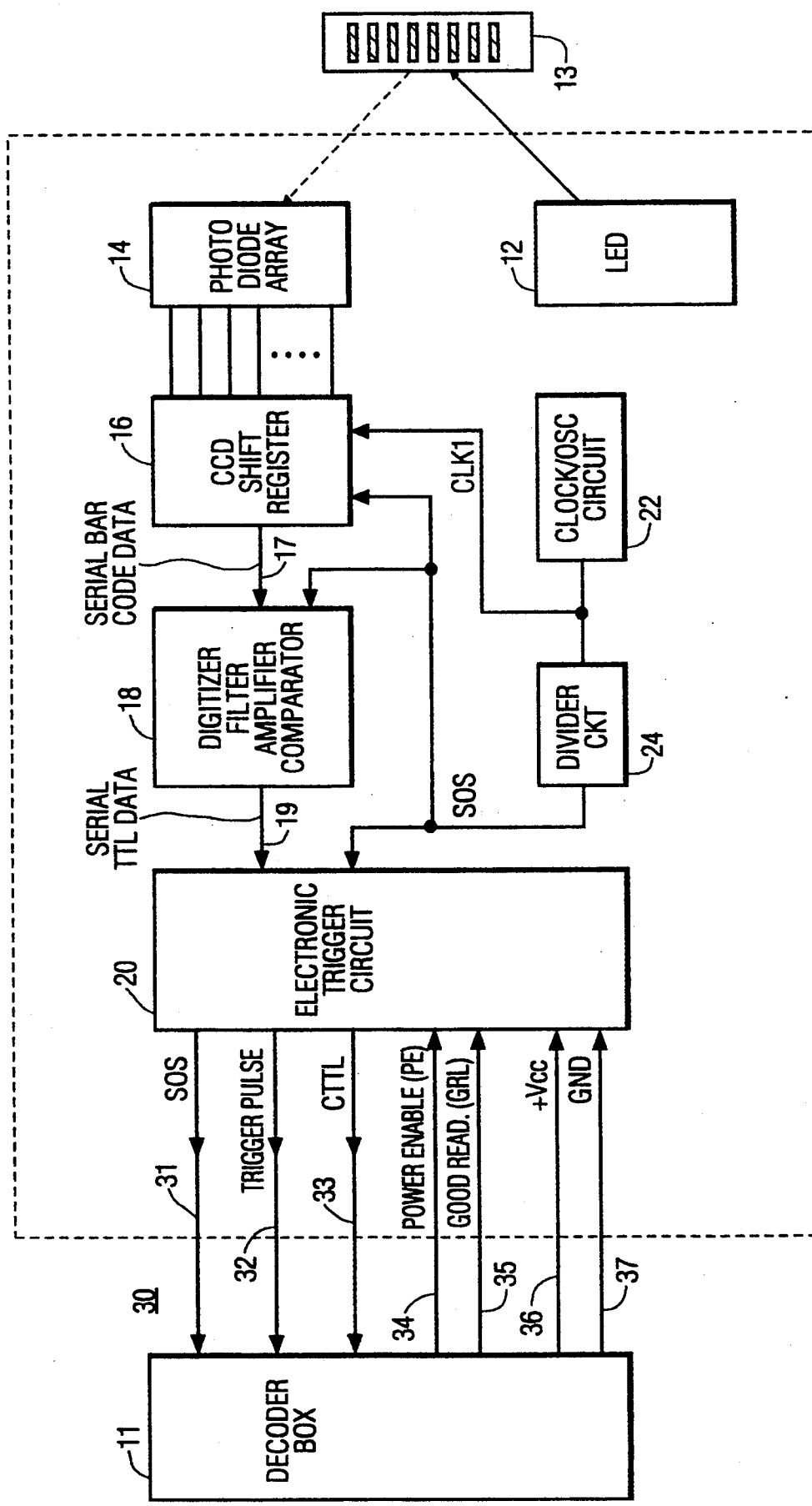
FIG. 1 is a block diagram of a system embodying the invention.

Referring to FIG. 1, there is shown a scanner 10 coupled to a decoder box 11 via several lines which are part of a cable assembly 30. The scanner 10 in the system of FIG. 1 includes a light source 12 for illuminating a bar code 13, a photodiode array 14 for sensing, in parallel, the amount of light (i.e., the picture) reflected from the bar code 13, a CCD shift register 16 for converting the photo data generated, in parallel, in photodiode array 14 to a serial format and for producing serial data on line 17 corresponding to the bar code data, a digitizer circuit 18 for converting the bar code data to full amplitude digital pulses (i.e., ones and zeros) denoted herein as TTL data, electronic trigger circuit 20 responsive to TTL data from digitizer 18 and an SOS signal derived from an oscillator clock circuit 22 and a divider circuit 24, for generating the electronic equivalent of a manual trigger pulse to enable the TTL data to be decoded in decoder box 11.

Light source 12 of scanner 10 may be an LED array or a laser beam or any other suitable light source for illuminating a bar code 13. [The circuitry to energize light source 12 and the optics to direct the light onto the bar code are not shown for ease of illustration.]

The photosensitive array 14 is designed to sense the light reflected from the bar code 13. In a particular embodiment the photo sensitive array 14 includes an array of 2048 photodiodes with each photodiode having a corresponding capacitor. Each photodiode charges its corresponding capacitor as a function of the light incident on the photodiode. Light reflected from the bar code 13 causes the photodiodes to conduct and charge their corresponding capacitors. The capacitors are charged up in parallel integrating the light signals for a predetermined "integrating" period of time. The capacitors may be part of a charge-coupled (CCD) array shift register 16. Alternatively, the capacitors may be separate and distinct capacitors for storing and integrating the photodiode currents and the stored information is then selectively transferred in parallel to corresponding stages of a charge-coupled shift register 16. [These different types of circuit are known in the art and need not be detailed.]

Note: A white surface reflects light while a dark surface absorbs light. Consequently, the reflection from the white space between the black bars of a bar code causes the corresponding photodiodes to charge their corresponding capacitors to a high level while the photodiodes corresponding to the black bars will cause very little charge to be accumulated across their corresponding capacitors which will then remain discharged or at a very low charge level.

The CCD shift register 16 produces a serial output on line 17 denoted as "SERIAL BAR CODE DATA" in FIG. 1. The SERIAL BAR CODE DATA output on line 17 is produced by applying clock pulses, CLK1, and start of scan (SOS) pulses to shift register 16 as detailed below. It is assumed that during each sensing (i.e. "read") interval the serial output produced on line 17 will include a pulse corresponding to each bar in the bar code 13 and the serial output will either be a replication of the black bars in bar code 13 or its inverse depending on whether or not the bar code data is inverted.

Note: In the discussion to follow it is assumed for purpose of illustration that any valid bar code causes the production of at least 8 pulses. Thus, whenever less than 8 pulses are produced during a read interval, the scanner assumes that the bar code is not valid. Clock/Oscillator circuit 22 produces a clock signal, identified as CLK1 in FIG. 1, which is applied to the CCD shift register 16 in order to transfer the contents of register 16 serially onto an output line 17. The CLK1 signal is also applied to a divider circuit 24 to produce a start of scan (SOS) signal which is used to define the integration period and the read out period of the scanner and the data. The frequency of the SOS signal is normally set to have a value equal to the frequency of CLK1 divided by a number equal to the number of stages of the shift register 16. Thus, in a system in which the CCD array 16 consisted of 2048 CCD stages, the divider circuit 24 divided the clock frequency by a factor of 2048.

By way of example, assume that the array 14 includes 2048 photodiodes with each photodiode being coupled to a corresponding capacitor. Each photodiode charges up its corresponding capacitor during each integration period. At the end of each integration period, the signal information accummulated across each capacitor is transferred (or shifted) to a corresponding stage of the shift register 16. That is, there is a parallel transfer of information from each diode/capacitor element in array 14 to a corresponding stage of shift register 16. Once information is transferred into the shift register the clock signal, CLK1, applied to the register 16 causes the serial read out of the shift register data onto a line 17 for application to a digitizer circuit 18.

In the system of FIG. 1, the contents of shift register 16 are serially read-out only during a "read" interval of the SOS cycle. Referring to FIG. 3 note that each cycle of the SOS signal includes a "read" interval followed by an "integrate" interval. During an SOS read interval the information in the CCD shift register 16 is clocked by CLK1 and the information in the shift register, denoted as "BAR CODE DATA" is serially produced on output line 17 and is applied to digitizer/filter/amplifier/comparator 18. The bar code data, as the name implies, corresponds to and represents the number of bars of bar code 13.

Digitizer circuit 18 coupled to the CCD 16 via line 17 includes filter means, an amplifier means and comparator means for sensing the bar code data signals generated by the CCD register 16 and amplifying the sensed signals and producing pulses which have either a "low" (e.g., zero volts) or a "high" (e.g., 5 volts) level. After the serial bar code data is digitized it is outputted on line 19 and is arbitrarily referred to as "SERIAL TTL DATA."

For purpose of illustration assume that a dark or black bar produces a "high" level and a light or white bar produces a "low" level on line 19. Thus, for each black bar there is a transition from a low (white) level to a high (black) level and from a high (black) level to a low (white) level. As noted above it is assumed that for a bar code to contain valid data there must be a minimum of 8 pulses during a "read" interval of the SOS pulse.

Note that in the system under discussion it is assumed that bar code data is sensed during each "integrate" SOS period and is transmitted throughout, the system when each SOS pulse is in the "read" mode, period or interval.

When the SOS pulse is in the read mode (which by way of example is the condition for which the SOS signal is in the high state), the SERIAL TTL DATA from digitizer 18 is applied via line 19 to electronic trigger circuit 20. The electronic trigger circuit responds to the presence of the SOS pulse and the SERIAL TTL DATA to produce a "trigger pulse" which is applied to the decoder box 11 via line 32. The trigger pulse activates a circuit (not shown) in decoder box 11 which in turn generates a power enable (PE) pulse which is fed from the decoder box 11 to the scanner 10 via line 34. As detailed below the power enable (PE) pulse allows "controlled" SERIAL TTL DATA ("CTTL") to be produced on line 33 and to be applied to the decoder box 11 via line 33. When the PE pulse is high ("enabled") the SERIAL TTL DATA on line 33, referred to in FIG. 1 as CTTL, is either identical to the SERIAL TTL DATA or is equal to its inverse. The CTTL data is analyzed in decoder box 11 (with circuitry not shown) to determine whether a valid bar code has been read. Until a valid bar code is sensed the ("high") PE signal allows TTL data to be continuously supplied via line 33 to decoder box 11. When the decoder 11 recognizes the presence of a valid set of bar code data, it causes the power enable (PE) pulse to go low (and the signal on line 33 to be low), terminating a scan cycle.

DETAILED DESCRIPTION OF FIG. 2

Figure 2:
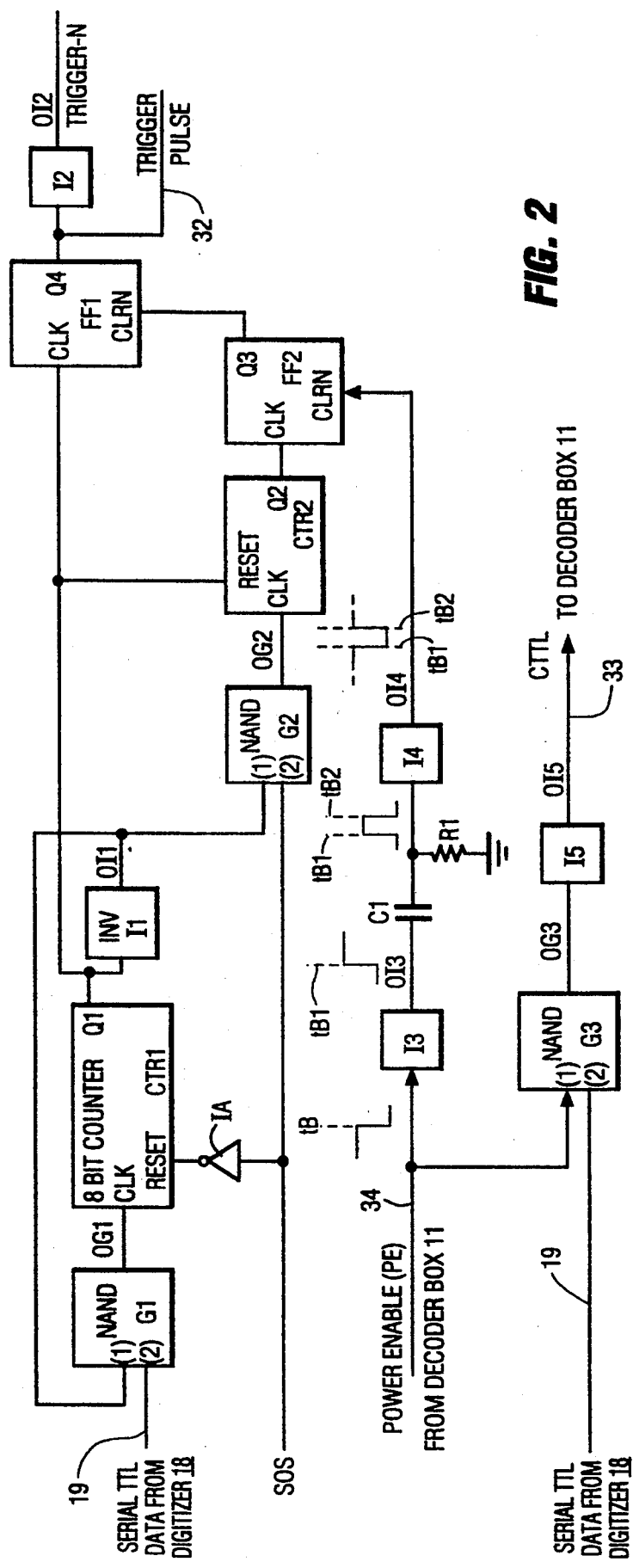
FIG. 2 is a symbolic representation of circuits used in a system embodying the invention.

Electronic trigger circuit 20 and its operation will now be detailed with reference to FIG. 2. As shown in FIG. 2, TTL data from Digitizer 18 is applied via line 19 to input 2 of a NAND gate G1 and the output, OG1, of G1 is applied to the clock (CLK) input of an eight (8) bit counter, CTR1. As discussed above and as shown in FIG. 3, SERIAL TTL pulses are only present on line 19 during the positive going ("read") portions of the SOS pulses. As detailed below the positive going portion of the SOS pulses are defined as "read intervals" and the negative going portions of the SOS pulses are defined as the "integration intervals". CTR1 is reset by the falling edge of each SOS pulse coupled via IA to the reset inout of CTR1. That is, each time an SOS pulse goes from high-to-low the output Q1 of CTR1 goes low. Assume, for example, that CTR1 counts each transition of OG1 (at its CLK input) which goes from low to high. Therefore Q1 remains low so long as less than 8 transitions occur during a positive going SOS pulse period. As soon as more than eight (8) low-to-high transitions occur during a read interval, Q1 goes high. Therefore, when Q1 goes high it indicates that at least 8 TTL data pulses occured during an SOS read interval. The Q1 output of CTR1 is applied to the input of inverter I1 whose output is fed back to one input (1) of NAND gate G1 and to one input (1) of NAND gate G2. When Q1 goes high the output OI1 of I1 goes low. When OI1 goes low, the output OG1 is driven high and remains high until CTR1 is reset.

The OI1 signal and the SOS pulses are applied to respective inputs of a two-input NAND gate G2 whose output OG2 is applied to the clock input of a four (4) bit counter CTR2. CTR2 is reset by Q1 whenever Q1 goes high. That is, whenever Q1 goes high the output Q2 of CTR2 goes low. This condition ensures that for Q2 to go high, four (4) SOS pulses must occur in succession during each of which there are less than 8 TTL data pulses.

In operation, when OI1 is high (i.e. Q1 is low), G2 functions as an inverter in response to the presence of SOS pulses and its output OG2 is applied to the clock input (CLK) of counter CTR2. CTR2 is a 4 bit counter and its output Q2 will remain low until 4 SOS pulses have occurred in succession (and been counted) after a reset pulse (i.e., Q1-high).

When four (4) SOS pulses have been counted Q2 of CTR2 goes high. Note that if during any SOS "read" interval Q1 goes high then CTR2 is reset and Q2 is driven low. Thus Q2 will be driven "high" only if four (4) SOS "read" pulses have occured in succession and if during each of these four (4) successive SOS "read" pulses there have been less than 8 SERIAL TTL DATA pulses input to counter CTR1. Otherwise, each time Q1 goes high CTR2 is reset and Q2 is driven low and will remain low until 4 SOS pulses occur during each of which less than 8 SERIAL TTL DATA pulses occur. The output Q1 of CTR1 is applied to the clock input of a flip-flop, FF1, and the output, Q2, of CTR2 is applied to the clock input of a flip-flop (FF2) whose output Q3 is applied to the "clear-not" (CLRN) input of a flip flop FF1. When Q3 is low, FF1 is held in a reset position and the output Q4 of FF is held low. When Q3 goes high FF1 is primed, whereby the next low-to-high transition of Q1 causes the output Q4 of FF1 to go from low-to-high. The output Q4 is arbitrarily defined as the "Trigger" pulse. The output Q4 is applied to an inverter I2 whose output, OI2, produces the compliment of the trigger pulse which is denoted as "Trigger N".

Returning to FF2, note that the CLRN input (i e., "clear-not") of FF2 is controlled by the output OI4 of inverter I4, as described below. The Trigger pulse is applied via line 32 to decoder box 11. As shown in FIG. 3, after the Trigger pulse goes from high-to-low at time tA the decoder box 11 produces a power enable (PE) pulse which goes from low-to-high. Following the high-to-low transition of a TRIGGER pulse which is applied to the decoder box 11, circuitry (not shown) in decoder box 11 produces a positive going power enable (PE) pulse which is supplied and applied to the scanner 10 via line 34. The positive going PE pulse is applied to the input of an inverter I3 and to one (1) input of a two-input NAND gate G3. When PE goes high, G3 functions as an inverter with respect to its other input to which is applied the SERIAL TTL DATA pulses produced by digitizer 18 and distributed via line 19. The output OG3 of G3 is applied to the input of an inverter I5 and is inverted via inverter I5 at whose ouput OI5 is produced the "controlled" TTL data (i.e., "CTTL") which is applied via line 33 to decoder box 11. The CTTL data is analyzed by decoding means (not shown) in decoder box 11. When the decoding means in decoder box 11 ascertains that the data is good (i.e., valid) a good-data-pulse (GRL) is produced which, for example, enables a buzzer (not shown) and good read light (not shown) on the scanner. More importantly, when the decoder box 11 ascertains that a valid set of bar code data has been read the PE pulse is terminated and goes from high-to-low as shown at time tB in FIG. 3. When PE goes low OG3 goes high and OI5 goes low and remains low whereby CTTL signals are no longer fed to decoder box 11 via line 33.

Referring to FIG. 2, note that the negative going transition of the PE pulse (at a time tB) applied to inverter I3 causes its output, OI3, to go from low-to-high (at a time tB1). The output of OI3 is coupled via capacitor C1 to the input of inverter I4 and to one end of resistor R1 whose other end is returned to ground. Due to R1, the input of I4 is normally low and its output OI4 is normally high. The "normal" condition of OI4-high removes the inhibit condition of FF2 and allows Q3 to go high when Q2 goes high. Note that when PE goes from low to high OI3 goes low and the condition of OI3 low is AC coupled via C1 to the input of I4 which is already low and whose output remains high. Thus the low-to-high transition of PE does not affect the circuit operation.

However, when PE terminates and goes from high-to-low as shown at time tB, OI3 goes from low-to-high at time tB1 (a small time delay after tB) and a positive going transition is AC coupled to the input of I4 causing OI4 to go from high-to-low for a time tB1 to tB2. The negative going transition of OI4 at time tB1 applied to the CLRN terminal of FF2 causes Q3 to go from high-to-low. When Q3 goes from high-to-low it causes Q4 to go from high to low causing the Trigger pulse to go low and the Trigger N pulse to go high, terminating a scan cycle.

Thus, the termination (i.e., falling edge) of the PE pulse causes the subsequent termination of the trigger pulse. And, as described above, a new trigger pulse will only be produced if: (a) 4 successive SOS pulses are produced during each of which there are fewer than 8 TTL pulses and (b) if following the 4 successive SOS "read" pulses there is an SOS "read" pulse during which more than 8 TTL pulses occur.

CTR1 has been described as an 8 bit counter. But, it should be evident that counter CTR1 may be a counter of "M" counts, where M is any integer which preferably corresponds to the minimum number of pulses in a valid set of bar code data. However, counter M may be arbitrarily selected to have any predetermined count.

CTR2 has been described as a 4 bit counter, but it should be evident that counter CTR2 may be a counter of "N" counts, where N is any integer. The number "N" is preferably selected to provide a period of time between the reading of one bar code and the reading of the next bar code which is sufficiently long to ensure that the same data is not reread while not creating too long an inhibit period.

Thus, the invention resides, in part, in the recognition that following each "good" read there must be a pause which is sufficiently long to ensure that the data just read to produce the good read is not re-read. This is achieved by requiring that a number "N" of SOS pulses following each "good" read do not include "possibly" good bar code data. In practice, this may be accomplished by momentarily pointing the scanner to a blank space or to a uniformly colored space. Thus, systems embodying the invention include:

1. A first counting (e.g CTR2) means for counting a number "N" of successive SOS reading intervals following each "good" set of bar code data;
2. A second counting means (e.g. CTR1) for counting the number of bar code pulses during each one of said "N" successive SOS reading intervals to ascertain that a good set of bar code data just read is not being re-read;
3. means for sensing the occurence of "N" successive SOS during each of which less than M bar code pulses occur;
4. means for sensing the occurence of an SOS pulse following the "N" SOS pulses during which M bar code pulses occur; and
5. means responsive to the occurence of conditions (3) and (4) above to generate a trigger pulse.

Therefore, systems embodying the invention provide a mechanism to automatically activate a hand held scanner to read a new bar code following a "good" read without re-reading the data just read.

The systems imposes a "pause" or inhibit period following each "good" read. During the "pause" there must occur N successive "bad" SOS pulses. Following the "N" successive SOS pulses during which the data read was "bad" the scanner is ready to look at potentially good bar code data. As soon as a potentially good set of bar code data is sensed a trigger pulse is then produced which enables the bar code data to be fed to the decoder box 11 for analysis.

What is claimed is:

1. An automatic electronically triggered bar code scanner comprising:
    a light source for illuminating a barcode exterior to the scanner;
    means for sensing the light reflected from a bar code and for digitizing signals corresponding to the reflected light and producing a series of bar code data pulses corresponding to said bar code;
    means for generating a train of start of scan (SOS) pulses, each SOS pulse having one phase defining a read interval and another phase defining an integrating interval, the read interval of each SOS pulse being sufficiently long to enable the occurence of a minimum number M of bar code data pulses, where a minimum of M bar code data pulses must occur during a read interval to produce a valid set of bar code data;
    means responsive to the bar code data pulses and to the SOS pulses for transmitting bar code data pulses to be decoded during each SOS read interval;
    selectively enabled trigger means responsive to bar code data pulses and to SOS pulses for generating a trigger pulse in response to the occurence of at least M bar code data pulses during an SOS read interval;
    means responsive to said trigger pulse and to said SOS and bar code data pulses for decoding the bar code data pulses and producing a valid data signal when a set of valid bar code data is decoded; and
    inhibit means responsive to said valid data signal for inhibiting said selectively enabled trigger means until N successive SOS pulses occur during each of which there are less than M bar code data pulses.

2. An automatic electronically triggered bar code scanner as claimed in claim 1 wherein said selectively enabled trigger means and said inhibit means include a first counter for counting the occurence of a predetermined number of bar code data pulses during each SOS read interval, and a second counter for counting the number of successive SOS read intervals during each of which less than M bar code data pulses have occured.

3. An automatic electronically triggered barcode scanner as claimed in claim 2 wherein said selectively enabled trigger means and said inhibit means include means coupled between said first and second counter for resetting said second counter whenever said first counter counts the occurence of said predetermined number of bar code pulses during an SOS read interval; and
    wherein the means for generating said trigger pulse includes a pulse generating means responsive to the outputs of the first and second counters and to the occurence of a valid data signal;
    said valid data signal setting said pulse generating means to an off state and the output of said second counter inhibiting said pulse generating means following the occurence of a valid data signal until the second counter has counted N successive SOS read intervals each with less than M pulses;
    said second counter then priming said pulse generating means and enabling said pulse generating means to respond to the output of said first counter producing a signal indicative of the occurence of M pulses during one SOS read interval.

4. The combination comprising:
    a hand held bar code scanner for automatically reading bar code data contained in a bar code;
    means coupling the scanner to a decoder; said decoder for processing the bar code data read by the scanner and producing a valid data signal whenever it recognizes a valid set of bar code data;
    said scanner including means for generating a train of start of scan (SOS) pulses, each SOS pulse having one phase defining a read interval and another phase defining and integrating interval, said scanner reading said bar code during a read interval and being responsive to said bar code data for producing bar code data pulses corresponding to the bar code data and including selectively enabled triggering means for generating a trigger pulse in response to the occurence of at least "M" bar code data pulses during a read interval;
    means responsive to said trigger pulse for generating a power enable pulse;
    means responsive to the presence of said power enable pulse and to said bar code data pulses for supplying said bar code data pulses to said decoder for analysis of the bar code data pulses and for producing a valid data signal upon the validation of the data; and
    means responsive to the production of a valid data signal for disabling the selectively enabled triggering means for a period of time which includes N successive read intervals during each of which there occurs less than M bar code data pulses, and for enabling the selectively enabled triggering means after the occurrence of N successive read intervals during each of which there occurred less than M bar code data pulses.

5. An automatic hand held bar code scanner comprising:
    means for illuminating a bar code;
    means for sensing the light reflected from the bar code and for producing pulses, corresponding to the light reflected from the bar code, which correspond to the underlying bar code data; a minimum number "M" of bar code data pulses being needed to be sensed during a predetermined time interval to produce a valid set of bar code data, where "M" is an integer equal to or greater than eight (8);
    means for generating a train of start of scan (SOS) pulses, said SOS pulses having a positive going period and a negative going period, one of said positive and negative going periods defining a read interval of at least equal duration to said predetermined time interval;
    first counting means for counting the number of bar code data pulses produced during each one of said SOS read intervals; and for producing a first signal when at least M bar code data pulses occur during an SOS read interval;
    second counting means for counting N successive SOS read intervals during each of which less than "M" bar code data pulses are present and for producing a second signal when N successive SOS signals occur during each of which less than M bar code data pulses are present; and
    means responsive to the first and second counting means for producing a trigger pulse in response to the occurence of said second signal followed by said first signal.

* * * * *